US009581112B2

(12) United States Patent
Hermann et al.

(10) Patent No.: US 9,581,112 B2
(45) Date of Patent: Feb. 28, 2017

(54) AIR FILTER ARRANGEMENT HAVING A CARBURETOR

(71) Applicant: ANDREAS STIHL AG & CO. KG, Waiblingen (DE)

(72) Inventors: Karl-David Hermann, Weinsberg (DE); Frederik Herrmann, Waiblingen (DE); Lukas Zürcher, Stuttgart (DE)

(73) Assignee: ANDREAS STIHL AG & CO. KG, Waiblingen (DE)

( * ) Notice: Subject to any disclaimer, the term of this patent is extended or adjusted under 35 U.S.C. 154(b) by 57 days.

(21) Appl. No.: 14/316,397

(22) Filed: Jun. 26, 2014

(65) Prior Publication Data

US 2015/0000234 A1 Jan. 1, 2015

(30) Foreign Application Priority Data

Jun. 28, 2013 (DE) ........................ 10 2013 010 848

(51) Int. Cl.

| | |
|---|---|
| ***B01D 46/24*** | (2006.01) |
| ***B01D 45/12*** | (2006.01) |
| ***F02M 35/024*** | (2006.01) |
| ***F02M 17/34*** | (2006.01) |

(52) U.S. Cl.
CPC ...... *F02M 17/34* (2013.01); *F02M 35/02416* (2013.01); *F02M 35/02483* (2013.01)

(58) Field of Classification Search
CPC .... B01D 46/24; B01D 45/12; B60H 1/00471; B60H 1/00028; F02M 35/024; F02M 35/0203; F01M 35/04
USPC ....... 55/510, 515, 495, 319, 385.3, DIG. 29; 123/198 E, 467, 573
See application file for complete search history.

(56) References Cited

U.S. PATENT DOCUMENTS

| | | | | |
|---|---|---|---|---|
| 3,347,028 A * | 10/1967 | Erbstoesser .......... | F02M 35/024 55/510 |
| 6,599,350 B1 * | 7/2003 | Rockwell ............... | B01D 45/12 123/519 |
| 7,384,440 B2 * | 6/2008 | Takano .............. | F02M 35/0203 123/198 E |
| 7,438,738 B2 * | 10/2008 | Uneta .................... | F02M 35/04 123/198 E |
| 7,753,980 B2 * | 7/2010 | Kobayashi ......... | F02M 35/0203 55/315 |
| 7,806,953 B2 * | 10/2010 | Schlauch ............... | B01D 46/24 123/198 E |

(Continued)

*Primary Examiner* — Jacoby T Minskey
*Assistant Examiner* — Minh-Chau Pham
(74) *Attorney, Agent, or Firm* — Paul D. Strain, Esq.; Strain & Strain PLLC

(57) ABSTRACT

An air filter and carburetor arrangement includes a round filter and a round filter carrier having a filter plate. The round filter has a central filter axis, which lies at an angle to the filter plate. The carburetor has a carburetor body, in which an intake duct is configured with a duct longitudinal axis, and at one end of the intake duct on the carburetor body a filter connection side for the round filter carrier is configured, wherein the round filter carrier is fixed with at least one surface portion of the filter plate on the connection surface of the carburetor. The design is provided such that the duct longitudinal axis of the intake duct lies in the plane of the filter plate at a lateral distance (r) to the filter axis of the round filter fixed to the round filter carrier.

19 Claims, 5 Drawing Sheets

(56) References Cited

U.S. PATENT DOCUMENTS

| | | | | |
|---|---|---|---|---|
| 7,914,609 | B2 * | 3/2011 | Sullivan | B01D 45/12<br>123/198 E |
| 7,998,232 | B2 * | 8/2011 | Krueger | B60R 21/34<br>180/274 |
| 8,002,863 | B2 * | 8/2011 | Kubo | F02M 35/024<br>123/198 E |
| 8,460,422 | B2 * | 6/2013 | McClure | F01N 3/0256<br>123/467 |
| 8,608,135 | B2 * | 12/2013 | Schultz | F02M 29/04<br>261/23.2 |
| 8,663,351 | B2 * | 3/2014 | Koch | B60H 1/00028<br>55/319 |
| 2001/0005984 | A1 * | 7/2001 | Knodler | F02M 17/04<br>55/385.3 |
| 2002/0017283 | A1 * | 2/2002 | Furuya | F01M 13/022<br>123/573 |
| 2007/0220848 | A1 * | 9/2007 | Diepolder | F02M 35/024<br>55/385.3 |
| 2008/0229721 | A1 * | 9/2008 | Richter | B60H 1/00471<br>55/385.3 |
| 2009/0007531 | A1 * | 1/2009 | Haussner | F02M 35/024<br>55/495 |
| 2015/0337778 | A1 * | 11/2015 | Wagner | B01D 46/0047<br>55/385.3 |

* cited by examiner

AIR FILTER ARRANGEMENT HAVING A CARBURETOR

CROSS-REFERENCE TO RELATED PATENT APPLICATIONS

This application is based upon and claims the benefit of priority from prior German Patent Application No. 10 2013 010 848.9, filed Jun. 28, 2013, the entire contents of which are incorporated herein by reference in their entirety.

BACKGROUND

The application relates to an air filter and carburetor arrangement involving a round filter and a round filter carrier having a filter plate and the carburetor has a carburetor body having an intake duct which is connected to the round filter carrier and forms a duct longitudinal axis.

The use of round filters for filtering the combustion air fed to an intake duct of a carburetor is known. Where handheld work tools are used, difficulties arise with respect to the arrangement in the housing of the work tool, because sufficient clearance must be provided for the installation and removal of the round filter.

One of the objects of the application is to configure an air filter arrangement having a round filter on a carburetor such that the air filter arrangement remains usable in cramped spatial conditions and ensures simple removal and fitting of the round filter.

SUMMARY OF PREFERRED EMBODIMENTS

This and other objects are achieved according to the air filter and carburetor arrangement according to the present application.

In an exemplary embodiment, the air filter and carburetor arrangement include an air filter which has a round filter and a round filter carrier having a filter plate, wherein the round filter has a central filter axis that lies at an angle to the filter plate. The arrangement also includes a carburetor having a carburetor body, wherein an intake duct is configured in the carburetor body with a duct longitudinal axis and wherein a filter connection side for the round filter carrier is configured at one end of the intake duct on the carburetor body. In this configuration the round filter carrier is fixed with at least one surface portion of the filter plate on the filter connection side of the carburetor, such that the duct longitudinal axis of the intake duct lies in the plane of the filter plate at a lateral distance (r) to the filter axis of the round filter fixed to the round filter carrier.

In another embodiment, the round filter is arranged such that its central filter axis lies at an angle to the filter plate. The carburetor has at one end of the intake duct on the carburetor body a connection surface for the round filter carrier, wherein the round filter carrier is fixed with at least one surface portion of the filter plate on the connection surface of the carburetor. The arrangement is here made such that the duct longitudinal axis of the intake duct has in the plane of the filter plate a lateral, preferably radial distance from the filter axis of the round filter fixed to the round filter carrier.

In a further embodiment, by virtue of this design, a carburetor lying deep in the housing of a work tool can also be equipped in a structurally simple manner with a round filter for filtering the combustion air. As a result of the radial offset of the round filter axis from the duct longitudinal axis of the intake duct, in conjunction with the inclination of the filter longitudinal axis to the filter plate of the filter carrier, the round filter can be oriented in a position which ensures simple removal and fitting of the round filter even where there are cramped conditions in the housing of the work tool.

In still a further embodiment, the filter plate is surrounded by a housing wall and forms together with this a housing pot having a central housing axis. The housing axis expediently lies coaxially with the round filter axis, so that the duct longitudinal axis of the intake duct lies at a lateral, preferably radial distance from the housing axis of the housing pot.

In still yet another embodiment, for the mounting of the round filter, a central holding rod for the round filter is provided on the filter plate. The design is here arranged such that the holding rod protrudes from the housing pot.

In yet a further embodiment, the housing wall cylindrically surrounds the holding rod, so that the cylinder axis of the housing wall corresponds to the longitudinal axis of the holding rod. Because the round filter is mounted on the holding rod, the longitudinal axis of the holding rod, the round filter axis and the cylinder axis of the housing wall are congruent to one another.

In another embodiment, the longitudinal axis of the holding rod is inclined by an angle to the plane of the filter plate and delimits an angle of less than 90° with the plane. In particular, the holding rod is inclined by an angle of around 15°, so that the longitudinal axis forms with the plane of the filter plate an angle of about 75°.

In another further embodiment, the housing wall is configured with varying height over the periphery of the housing pot, wherein the rim of the housing wall forms a marginal plane that lies at an angle to the plane of the filter plate. Preferably, the marginal plane forms with the plane of the filter plate an angle which corresponds to the angle of inclination of the holding rod, i.e. has a magnitude of around 15°.

According to another embodiment within the scope of the configuration according to the application, it is provided that the intake duct, in a region between the holding rod and the housing wall, opens out into the housing pot. In the same way, an air duct, in the region of the filter plate, opens out into the housing pot, wherein the air duct can be provided on the carburetor body.

In yet another further embodiment, the connection cross-section of the air duct and/or the connection cross-section of the intake duct lie partially outside the surface of the air filter plate. This means that a part of the connection cross-section lies outside the housing pot defined by the housing wall. Preferably, it is provided to configure a connection cross-section partially in the housing wall and partially in the filter plate, wherein the housing wall has hoods, bulges or the like for coverage of the connection cross-section.

According to still another embodiment, on the holding rod is mounted an inner body for the round filter, wherein the inner body has internal partitions, which section off the connection cross-section of the air duct from the connection cross-section of the intake duct. The internal partitions are designed such that a type of closed impact absorber, which prevents passage of fuel/air mixture from the region of the intake duct into the region of the air duct and/or into the region of the compensation duct, is configured for the mouth of the intake duct.

In another embodiment, the carburetor is a diaphragm carburetor having an additional air duct, wherein a fuel-filled control chamber is configured in the carburetor body. The control chamber is delimited by a diaphragm, wherein the diaphragm side facing away from the control chamber is subjected to an air pressure via a compensation duct. The compensation duct opens out in the housing wall into the housing pot of the round filter carrier.

In a further embodiment, the round filter carrier is fastened to the carburetor body, wherein one fastening point lies within the filter plate and one fastening point lies outside the filter plate.

According to another embodiment, the duct longitudinal axis of the intake duct has a first point of intersection with the plane of the filter plate; the filter axis has a second point of intersection with the plane of the filter plate. The distance apart of the points of intersection, measured in the plane, corresponds to the lateral distance. This, in particular, radially measured distance between the filter axis and the duct longitudinal axis is dimensioned at around 6 mm to 12 mm, advantageously realized at 8 mm.

Further objects, features, and advantages of the present application will become apparent form the detailed description of preferred embodiments which is set forth below, when considered together with the figures of drawing.

BRIEF DESCRIPTION OF THE DRAWINGS

Exemplary embodiments of the application will be explained below with reference to the figures of drawing, in which.

DETAILED DESCRIPTION OF PREFERRED EMBODIMENTS

Figure 1:
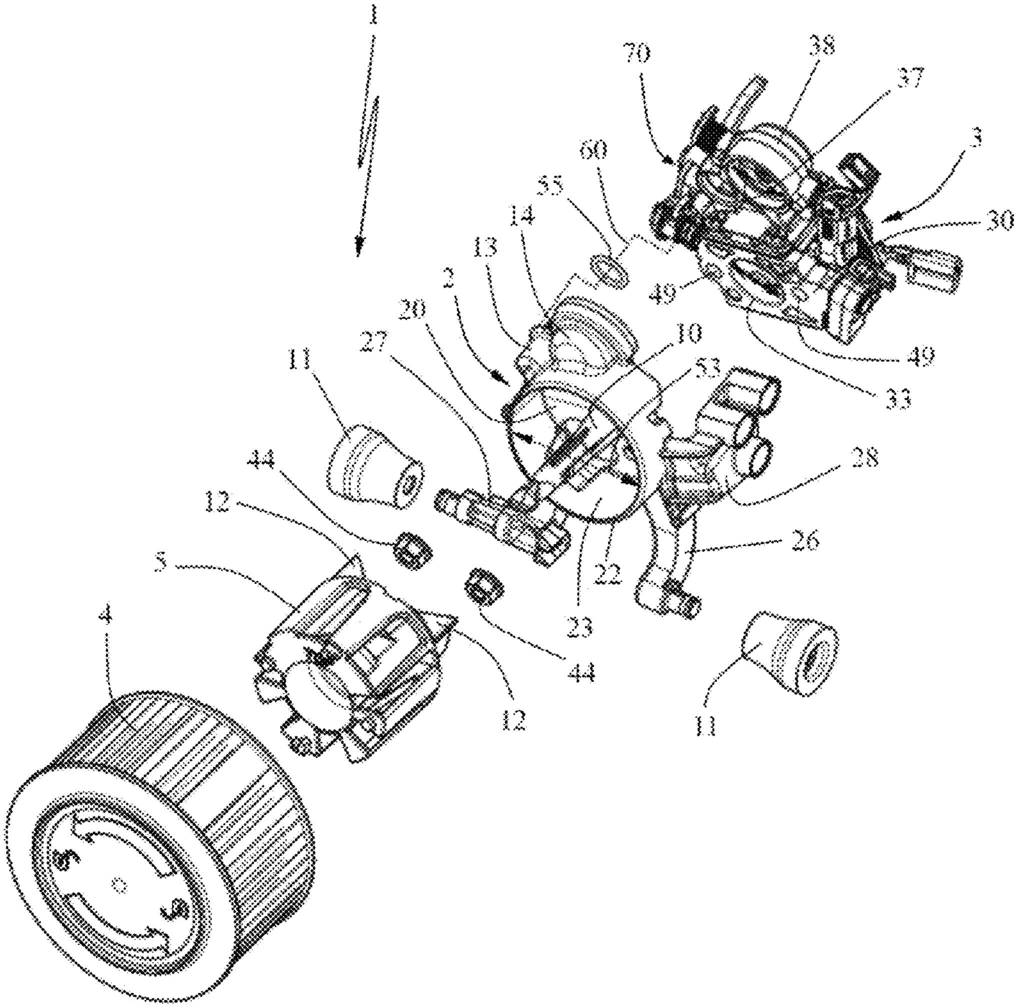
FIG. 1 shows an air filter arrangement having a round filter, a round filter carrier and a carburetor in schematic exploded representation.

Turning to the FIGS. of drawing, the air filter arrangement 1 represented in FIG. 1 consists of three basic components, namely the carburetor 3, the round filter carrier and the round filter 4 to be fixed on the round filter carrier 2. As the intermediate component between the round filter carrier 2 and the round filter 4 is provided an inner body 5, which, inter alia, also assumes the function of an impact absorber.

Figure 2:
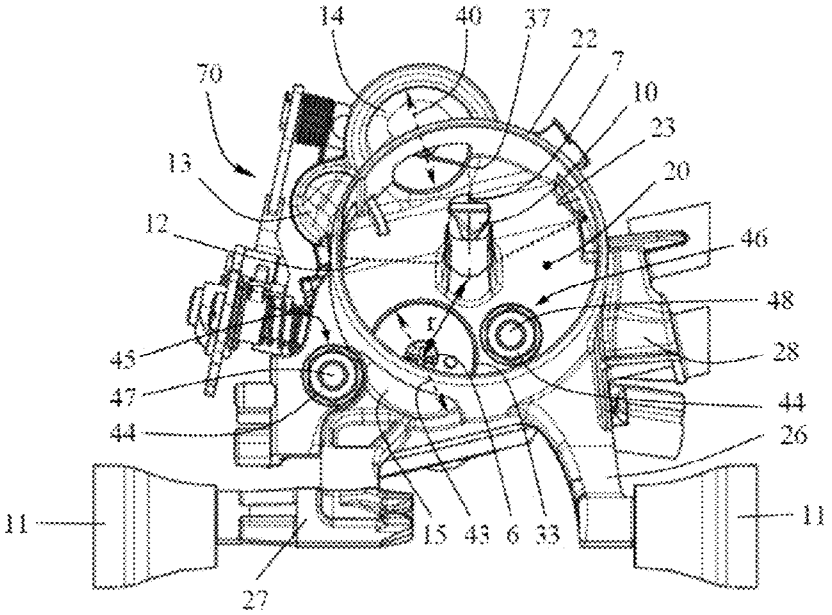
FIG. 2 shows a top view of a round filter carrier mounted on a carburetor.
Figure 3:
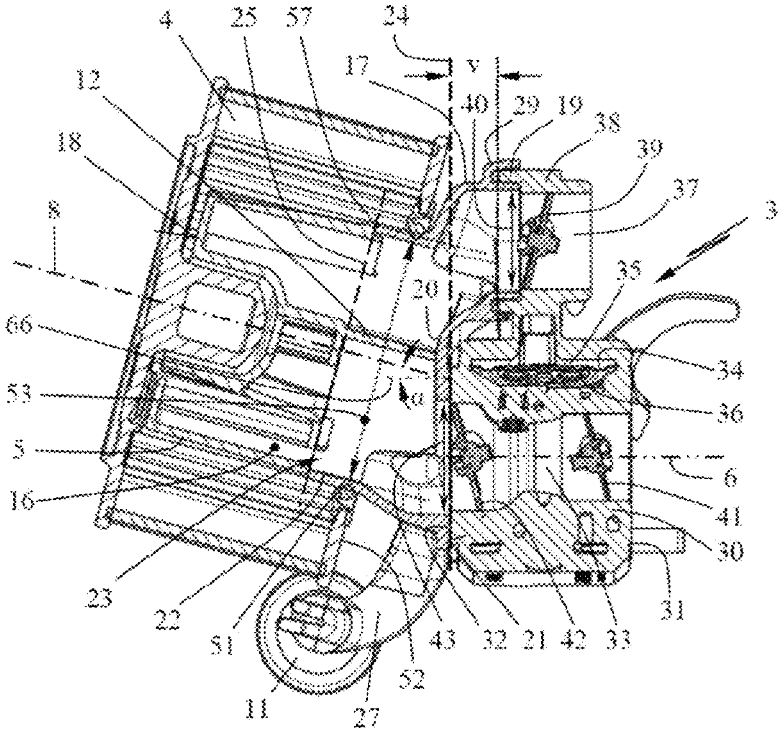
FIG. 3 shows a section through a carburetor having a round filter carrier and a mounted round filter.

As shown in FIGS. 1 to 3, in this embodiment, the carburetor 3 is configured as an airhead carburetor, having a carburetor body 30, which has a motor connection side 31 and a filter connection side 32. In the carburetor body 30 is configured an intake duct 33, as is shown in FIG. 3. The intake duct 33 runs from the filter connection side 32 to the motor connection side 31 and has a duct longitudinal axis 6.

In the carburetor body 30—lying on a longitudinal side of the intake duct 33—is configured a fuel-filled control chamber 36, which is separated from a compensation chamber 35 by a diaphragm 34. The compensation chamber 35 is subjected to ambient air—as is described in detail below—via a compensation duct 60 (FIG. 1). The compensation chamber 35 is connected via the compensation duct 60 to the clean air side of the round filter 4.

In the embodiment according to FIG. 3, a housing part 38, in which an air duct 37 is configured, is flange-connected to the carburetor body 30. In the air duct 37 is provided an air flap 39, which is pivotable about an axis and with which the opening cross-section of the air duct 37 is adjustable. On the filter connection side 32 of the carburetor 3, the air duct has a preferably circular connection cross-section 40.

In the intake duct 33, which is preferably configured as a Venturi tube, a throttle valve 41, which is pivotable about an axis and controls the passage cross-section of the intake duct 33, is disposed in the region of the motor connection side 31. On the filter connection side 32 is provided in the intake duct 33 a choke valve 42, which is likewise pivotable about an axis and at start-up is closed in order to raise the intake vacuum in the intake duct 33. The intake duct 33 has on the filter connection side 32 a preferably circular connection cross-section 43. Throttle valve, choke valve and air flap are actuated, in a manner not represented in detail, via a lever mechanism.

As can be seen from the sectional representation in FIG. 3, the connection cross-section 40 of the air duct 37 lies—in the direction of the duct longitudinal axis 6 of the intake duct 33—offset from the round filter carrier 2 by an offset v; the connection cross-section 40 lies with the offset v and thus at a distance from the plane of the motor connection side 32 or from the plane 24 of the filter plate 20.

The round filter carrier 2 is represented in detail in FIGS. 5 to 9. As shown by the sectional representations in FIGS. 8 and 9, the round filter carrier 2 has a filter plate 20. The filter plate 20 is defined as the area, which, in the direction of the round filter axis 8, corresponds to the projection of the opening 53 of the round filter 4 onto the base area of the round filter carrier 2, as is represented in FIG. 3 by dotted lines. In other words, the surface of the filter plate 20 is defined by the surface area, which, with mounted round filter 4 and mounted carburetor 3 (FIG. 3) corresponds to the projection of the opening 53 of the round filter 4 onto the filter connection side 32 of the carburetor body 30. The filter plate 20 forms a part of the base area of the round filter carrier 2.

The filter plate 20 has a surface portion 21, facing the filter connection side 32 of the carburetor 3, with which the round filter carrier 2 is fixed on the filter connection side 32 of the carburetor body 30. As shown by FIGS. 1 to 2, the round filter carrier 2 is fixed to the carburetor body 3 at two fastening points 45 and 46. One fastening point 46 lies within the filter plate 20, while the other fastening point lies outside the filter plate 20. In the shown illustrative embodiment, the fastening points 45 and 46 are formed by screw bolts 47 and 48, which project through passage openings 49 in the carburetor body 30 and bear the screw nuts 44 for fixing the carburetor body 30 to the round filter carrier 2.

Figure 7:
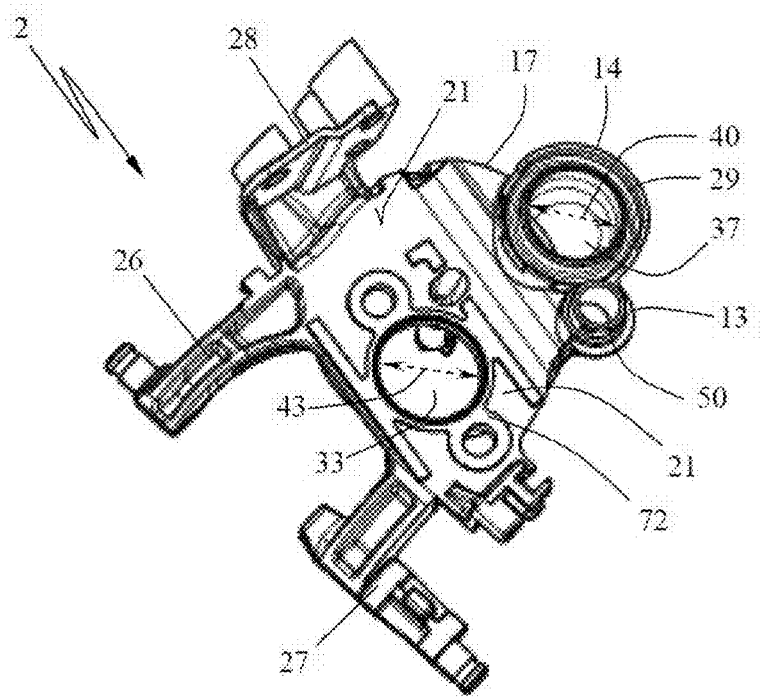
FIG. 7 shows a view of the carburetor connection side of the round filter carrier.
Figure 8:
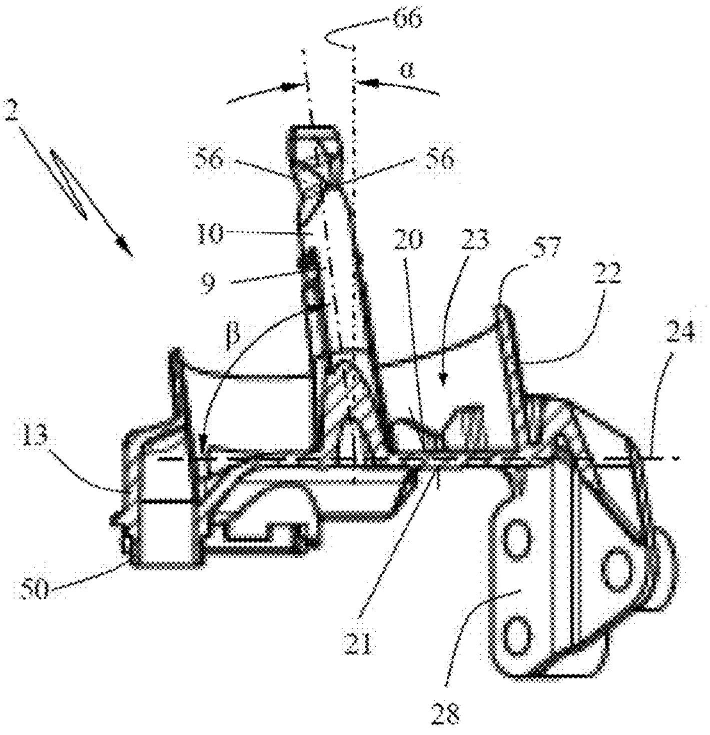
FIG. 8 shows a first section through the round filter carrier according to FIG. 5.
Figure 9:
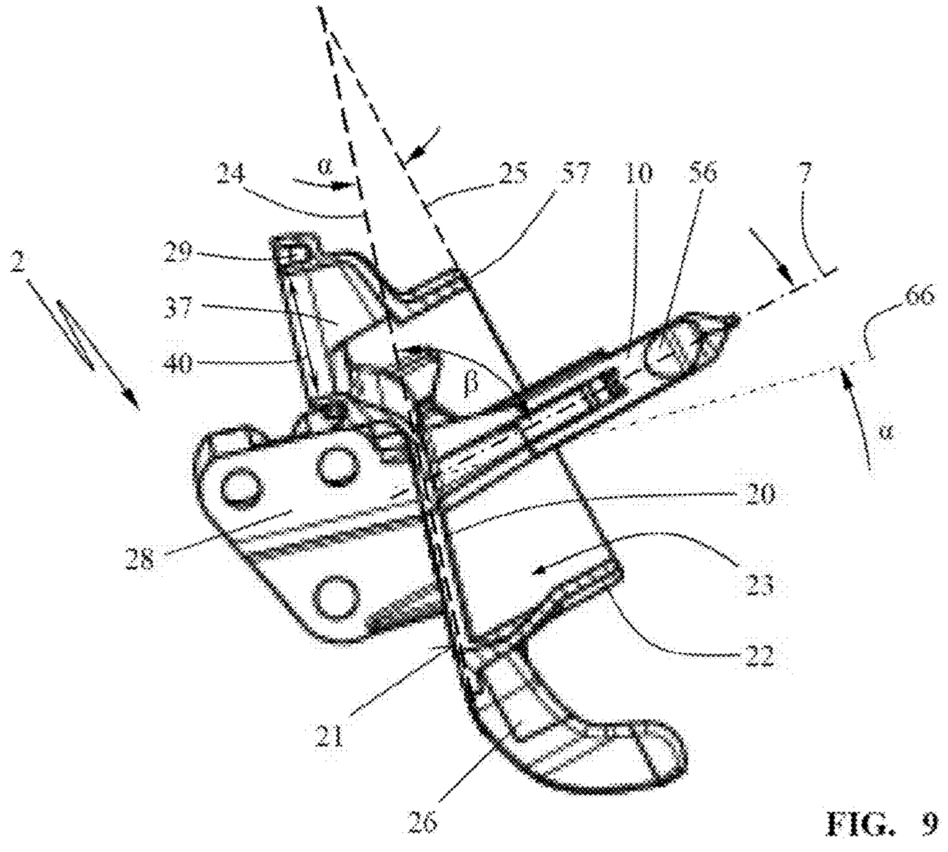
FIG. 9 shows a further section through the round filter carrier according to FIG. 5.

As shown by the representations according to FIGS. 5 to 9, a housing wall 22 surrounds the filter plate 20, i.e. the housing wall 22 delimits the surface of the filter plate 20. The design is preferably arranged such that the filter plate 20 forms together with the housing wall 22 a housing pot 23. This housing pot 23 has a central housing axis 7. As shown by FIGS. 8 and 9, the housing axis 7 is arranged tilted in relation to the filter plate 20; the angle of inclination a of the housing axis 7 to a perpendicular 66 to the filter plate 20 is advantageously 15°.

As shown in FIG. 2, related to the housing pot 23, one fastening point 46 of the carburetor 3 lies within the housing pot 23, while the other fastening point 45 of the carburetor 3 lies outside the housing pot 23.

As shown in FIGS. 1, 5, 8, and 9. On the filter plate 20 is provided, in an embodiment, a holding rod 10, which is disposed in the center of the filter plate 20 and serves for the mounting of the round filter 4. The holding rod 10 is configured in one piece with the round filter carrier 2 and has a longitudinal axis 9 corresponding to the housing axis 7.

Figure 5:
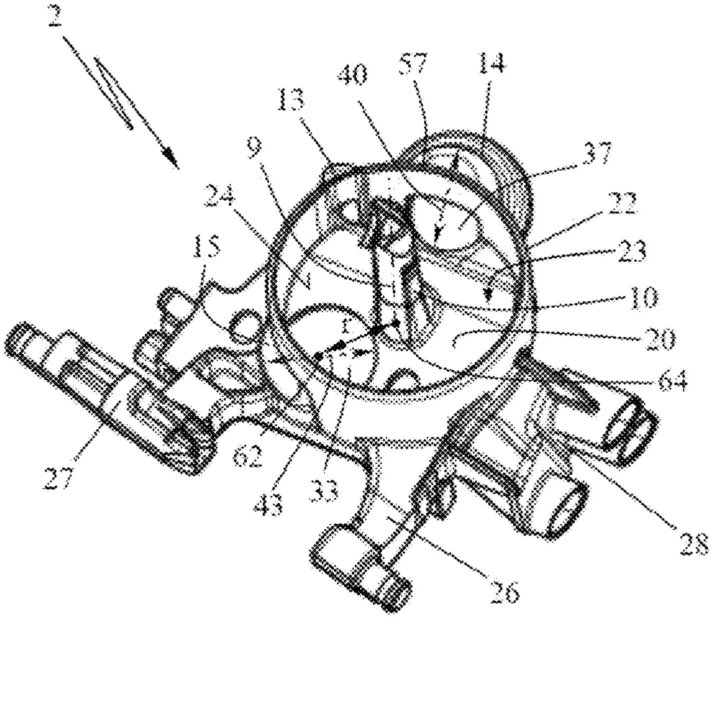
FIG. 5 shows in perspective representation a round filter carrier.
Figure 6:
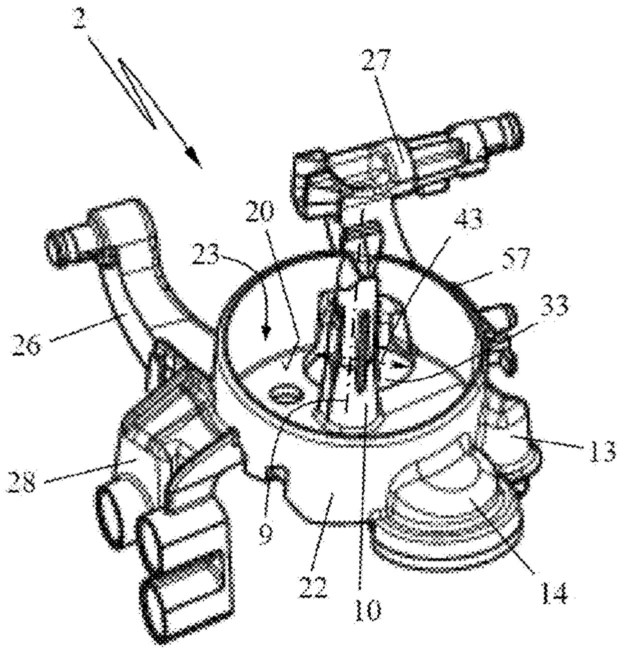
FIG. 6 shows a further view of the round filter carrier according to FIG. 5.

As shown, in particular, by the sectional representations according to FIGS. 5, 8, and 9, the holding rod 10 protrudes from the housing pot 23, that is to say the holding rod 10 is configured higher than the housing wall 22. Because the longitudinal axis 9 of the holding rod 10 coincides with the housing axis 7, the housing wall 22 cylindrically surrounds the holding rod 10, wherein the cylinder axis of the housing wall 22 corresponds to the longitudinal axis 9 of the holding rod 10. As can be seen from FIGS. 5, 8, and 9, the longitudinal axis 9 of the holding rod 10 forms with the plane 24 of the filter plate 20 an angle β of less than 90°; in the shown illustrative embodiment, the inclination of the holding rod 10 in relation to the filter plate 20 is realized such that the angle β between the plane 24 of the filter plate 20 and the longitudinal axis 9 of the holding rod 10 is about 75°.

The housing wall 22 is realized with varying height over the periphery of the housing pot 23. Expediently, the upper rim 57 of the housing wall 22 defines a marginal plane 25, which lies at the angle α of preferably 15° to the plane 24 of the filter plate 20.

As shown in FIGS. 4 to 7, the round filter carrier 2 further has two mounting legs 26, 27, which are of roughly L-shaped design and bear at their free end an elastic socket 11, with which sockets the round filter carrier 2 is held elastically mounted in the housing (not represented) of a work tool.

Onto one side of the round filter carrier 2 there is also formed an appendage 28, which reaches over the carburetor body 30 and is configured as a guide for an adjusting tool in case of access to adjusting members of the carburetor 3, such as idle screw, main jet screw and idle stop screw.

In the region of the housing wall 22 are also configured hood-shaped bulges 13, 14 and 15, which are further discussed below.

Figure 4:
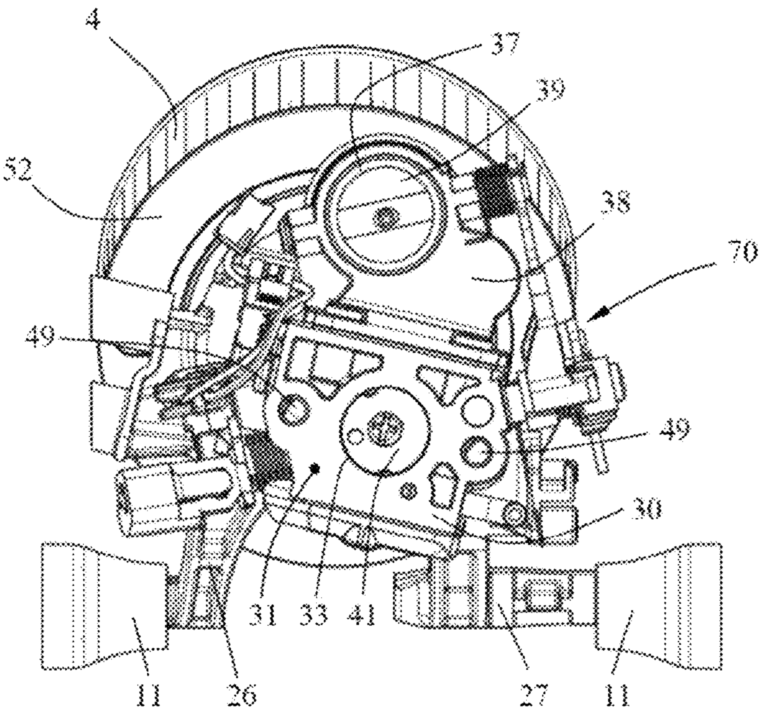
FIG. 4 shows a view of the motor connection side of a carburetor with mounted round filter.

As shown in FIGS. 3 and 4, the surface portion 21 of the filter plate 20 is fixed—where necessary with the interposition of a flat seal—on the filter connection side of the carburetor body 30. In an embodiment, on the surface portion 21 is configured a raised seal contour 72 (FIG. 7), which surrounds the opening of the intake duct 33 and, expediently, the passage openings 49 in the carburetor body 30. Through appropriate configuration of the seal contour 72, an additional seal can be dispensed with. For the connection of the air duct 37, on the housing part 38 of the air duct 37 is configured an engaging ring 19, which engages in a sealing groove 29 of the round filter carrier 2. The sealing groove 29 is also represented in FIG. 7. Because the connection cross-section 40 of the air duct 37 is set back from the filter connection side 32 by the offset v, on the filter plate 20 is configured a connection portion 17, which reaches over the carburetor body 30 (FIG. 3) and bridges the offset v. In the region of the connection of the air duct 37, the filter plate 20 has a step, which is formed by the portion 17. With screwing of the round filter carrier 2 on the filter connection side 32 of the carburetor body 30, the engaging ring 19 is simultaneously fixed in the sealing groove 29. The connection portion 40 of the air duct 37, just like the connection portion 43 of the intake duct 33, is connected to the filter plate 20.

As shown in FIGS. 2 and 3, the intake duct 33 opens out with a connection cross-section 43 in such a way in the filter plate 20 that its mouth lies in a region between the holding rod 10 and the rim of the filter plate 20, in particular between the holding rod 10 and the housing wall 22 of the housing pot 23. Similarly, the air duct 37 of the airhead carburetor, which is provided on the carburetor body 30, opens out into the filter plate 20, wherein a connection cross-section 40 of the air duct 37 lies partially outside the surface of the filter plate 20. As represented in FIG. 2, the connection cross-section 40 of the air duct 37 lies—viewed in top view of the housing pot 23—partially within the filter plate 20 or within the housing pot 23 formed by the housing wall 22. In an embodiment, around 20% to 50% of the connection cross-section 40 lies within the housing pot 23, while the remaining share of the connection cross-section lies in the hood or bulge 14 configured on the housing wall 22.

Similarly, the connection duct of the intake duct 33 is connected to the filter plate 20. Around 60% to 90% of the connection cross-section 43 lies within the filter plate 20 or within the housing pot 23 formed by the housing wall 22, while the remaining share of the connection cross-section 43 lies in a smaller hood or bulge 15 of the housing wall 22.

Via a further hood or bulge 13, a compensation duct 60 shown in FIG. 1 is connected to the housing pot 23, which is connected to the compensation chamber 35 of the diaphragm carburetor 30. The connection cross-section of the compensation duct 60 is configured substantially in the housing wall 22. For the leak-tight connection of the compensation duct 60, a connection branch 50 is configured on the round filter carrier 2, as shown by FIG. 7. The connection branch 50 engages directly in the carburetor body 30, wherein a seal 55, which seal forms a seal between the connection branch 50 and the carburetor body 30, is provided.

As shown in FIGS. 1 to 3, the inner body 5 is centrally penetrated by the holding rod 10 and forms a type of supporting body for the round filter 4. The inner body 5 has on its end face facing the housing pot 23 partitions 12, which project into the housing pot 23 and—as shown in dashed representation in FIG. 2—separates the mouth of the air duct 37 and of the compensation duct 60 from the mouth of the intake duct 33 in order to prevent any mixture which pulses back out of the intake duct 33 from entering the air duct 37 or the compensation duct 60.

The partitions 12 continue inside the inner body 5, so that a type of impact absorber 16 for the intake duct 33 is formed, which impact absorber, on the clean side of the round filter 4, fully separates the air duct 37 from the intake duct 33. The inner body 5 is centered by the holding rod 10 and sits on the rim 57 (FIG. 3) on the housing wall 22. The inner body 5 is axially supported on the rim 57 of the housing wall 22.

As shown in FIGS. 1 to 3, the round filter 4 is mounted onto the holding rod 10, wherein the housing wall 22 of the housing pot 23 is reached over by the housing of the round filter 4. The housing wall 22 projects into the opening 53 configured in the round filter plate 52, wherein a seal 51 seals the round filter plate 52 with respect to the housing wall 22. In the round filter 4 is provided at least one retaining spring, which cooperates with a notch 56 (FIG. 8) in the holding rod 10 of the round filter carrier 2. By the retaining spring which engages in the notch 56, the round filter 4 is pulled axially against the housing pot 23, wherein the round filter 4 is supported on the upper end face 18 of the inner body 5 (FIG. 3). The inner body 5 is supported on the rim 57 of the housing pot 23, wherein the partitions 12 project into the housing pot 23 and reach as far as the air filter plate 20, expediently sit on the filter plate 20.

As shown by FIG. 3, the filter axis 8 of the round filter 4 lies at an angle α to a perpendicular normal to the plane 24 of the filter plate 20, wherein the angle of inclination of the filter axis 8 to the plane 24 of the filter plate 20 corresponds to the angle α, i.e. is preferably 15°. The filter axis 8 lies congruent to the longitudinal axis 9 of the holding rod 10 and to the housing axis 7 of the housing pot 23.

As shown by FIGS. 2 and 3, the duct longitudinal axis 6 of the intake duct 33 lies in the plane 24 of the filter plate 20 at a lateral, preferably radial distance r from the filter axis 8 of a round filter 4 held on the round filter carrier 2.

Because the housing axis 7 of the housing pot 23, the longitudinal axis 9 of the holding rod 10 and the filter axis 8 of the round filter 4 coincide, the duct longitudinal axis of the intake duct 33 lies also at a lateral, radial distance r from the housing axis 7 of the housing pot 23.

As represented in FIGS. 2 and 5, the duct longitudinal axis 6 of the intake duct 33 has a first point of intersection 62 with the plane 24 of the filter plate 20; in addition, the longitudinal axis 9 of the holding rod 10, which corresponds with the filter axis 8 (FIG. 3), has a second point of intersection 64 with the plane 24 of the filter plate 20. The distance, measured in the plane 24, between the two points of intersection 62 and 64 corresponds to the distance r. The distance r is expediently chosen between around 6 mm to 12 mm; a preferred embodiment is obtained if the distance is realized at around 8 mm.

The invention claimed is:

1. An air filter and carburetor arrangement comprising:

an air filter which comprises a round filter and a round filter carrier having a filter plate, wherein the round filter has a central filter axis that lies at an angle to the filter plate, a carburetor which comprises a carburetor body, wherein an intake duct is configured in the carburetor body with a duct longitudinal axis, wherein a filter connection surface is configured at one end of the intake duct on the carburetor body allotted to contact at least one surface portion of said filter plate, wherein the round filter carrier is fixed with at least said surface portion of the filter plate on the filter connection surface of the carburetor, such that the duct longitudinal axis of the intake duct lies in the plane of the filter plate at a lateral distance (r) to the filter axis of the round filter fixed to the round filter carrier.

2. The air filter and carburetor arrangement according to claim 1, wherein the filter plate is surrounded by a housing wall, wherein the filter plate and housing wall together bound a housing pot having a central housing axis, and wherein the duct longitudinal axis lies at a lateral distance (r) to the housing axis of the housing pot.

3. The air filter and carburetor arrangement according to claim 1, wherein the filter plate has a central holding rod for the round filter, and the holding rod has a longitudinal axis.

4. The air filter and carburetor arrangement according to claim 2, wherein the holding rod protrudes from a housing pot.

5. The air filter and carburetor arrangement according to claim 3, wherein the housing wall of a housing pot cylindrically surrounds the holding rod, and the housing axis of the cylindrical housing wall corresponds to the longitudinal axis of the holding rod.

6. The air filter and carburetor arrangement according to claim 3, wherein the longitudinal axis of the holding rod forms with the plane of the filter plate an angle (β) of less than 90° .

7. The air filter and carburetor arrangement according to claim 6, wherein the angle (β) is about 75°.

8. The air filter and carburetor arrangement according to claim 2, wherein the housing wall is configured with varying height over the periphery of the housing pot, and its rim lies in a common marginal plane.

9. The air filter and carburetor arrangement according to claim 2, wherein the intake duct opens out into the housing pot in a region between the holding rod and the housing wall.

10. The air filter and carburetor arrangement according to claim 2, wherein an air duct is provided on the carburetor body, and wherein the air duct is connected to the housing pot in the region of the filter plate.

11. The air filter and carburetor arrangement according to claim 9, wherein the connection cross-section of the air duct and/or the connection cross-section of the intake duct lies partially outside the face of the air filter plate.

12. The air filter and carburetor arrangement according to claim 11, wherein the connection cross-section is configured partially in the housing wall and partially in the filter plate.

13. The air filter and carburetor arrangement according to claim 3, wherein the holding rod bears an inner body for the round filter, and wherein the inner body has internal partitions which separate the connection cross-section of the air duct from the connection cross -section of the intake duct.

14. The air filter and carburetor arrangement according to claim 1, wherein the carburetor is a diaphragm carburetor having a fuel-filled control chamber, wherein the diaphragm carburetor has a control chamber delimited by a diaphragm, wherein the diaphragm side facing away from the control chamber is subjected to an air pressure via a compensation duct, and wherein the compensation duct opens out in the housing wall into the housing pot.

15. The air filter and carburetor arrangement according to claim 1, wherein the round filter carrier is fastened to the carburetor body, wherein a fastening point lies within the filter plate and a fastening point lying outside the filter plate.

16. The air filter and carburetor arrangement according to claim 1, wherein the duct longitudinal axis of the intake duct has a first point of intersection with the plane of the filter plate, wherein the filter axis has a second point of intersection with the plane of the filter plate, and wherein the distance apart (r) of the points of intersection in the plane being 6 mm to 12 mm.

17. The air filter and carburetor arrangement according to claim 16, wherein the distance apart (r) of the points of intersection is 8 mm.

18. An air filter and carburetor arrangement comprising:

an air filter which comprises a round filter and a round filter carrier having a filter plate, wherein the round filter has a central filter axis that lies at an angle to the filter plate, wherein the filter plate has a central holding rod for the round filter, wherein the holding rod has a longitudinal axis, wherein the holding rod is surrounded by a housing wall, a carburetor which comprises a carburetor body, wherein an intake duct is configured in the carburetor body with a duct longitudinal axis, wherein a filter connection surface is configured at one end of the intake duct on the carburetor body allotted to contact at least one surface portion of said filter plate, wherein the round filter carrier is fixed with at least the said surface portion of the filter plate on the filter connection surface of the carburetor, such that the duct longitudinal axis of the intake duct lies in the plane of the filter plate at a lateral distance (r) to the longitudinal axis of the holding rod and the filter axis of the round filter fixed to the round filter carrier, and wherein the intake duct opens out into the housing wall in a region between the holding rod and the housing wall.

19. An air filter and carburetor arrangement comprising:

an air filter which comprises a round filter and a round filter carrier having a filter plate, wherein the round filter has a central filter axis that lies at an angle to the filter plate, a carburetor which comprises a carburetor body, wherein an intake duct is configured in the carburetor body with a duct longitudinal axis, wherein a filter connection surface is configured at one end of the intake duct on the carburetor body allotted to contact at least one surface portion of said filter plate, wherein the round filter carrier is fixed with at least the said surface portion of the filter plate on the filter connection surface of the carburetor, such that the duct longitudinal axis of the intake duct lies in the plane of the filter plate at a lateral distance (r) to the filter axis of the round filter fixed to the round filter carrier, wherein the intake duct opens out into the housing wall in a region between the holding rod and the housing wall, and wherein the connection cross-section of the air duct and/or the connection cross-section of the intake duct lies partially outside the face of the air filter plate.

* * * * *